United States Patent [19]

Bänziger et al.

[11] Patent Number: 4,799,263

[45] Date of Patent: Jan. 17, 1989

[54] SPEAKING AND HEARING SYSTEM FOR BREATHING APPARATUS

[75] Inventors: Fritz A. Bänziger, Gross Wesenberg; Peter Klein, Delmenhorst, both of Fed. Rep. of Germany

[73] Assignee: Dragerwerk AG, Fed. Rep. of Germany

[21] Appl. No.: 27,344

[22] Filed: Mar. 18, 1987

[30] Foreign Application Priority Data

Mar. 19, 1986 [DE] Fed. Rep. of Germany ....... 3609097

[51] Int. Cl.[4] .............................................. H04M 9/00

[52] U.S. Cl. ...................................... 381/94; 379/175; 381/157; 367/132

[58] Field of Search ................ 379/175; 381/157, 158, 381/94, 110; 181/242; 367/132

[56] References Cited

U.S. PATENT DOCUMENTS

| | | | |
|---|---|---|---|
| 1,770,821 | 7/1930 | Troisi | 379/175 |
| 3,123,680 | 3/1964 | Minton, Jr. et al. | 381/157 |
| 3,415,245 | 12/1968 | Yamamoto et al. | 181/242 |
| 4,154,981 | 5/1979 | Dewberry et al. | 379/175 |

*Primary Examiner*—Marshall M. Curtis

*Attorney, Agent, or Firm*—McGlew and Tuttle

[57] ABSTRACT

A speaking and hearing system for respirators, where the apparatus wearer is connected to a respiratory gas supply independent of the ambient air. A suppression, independent of acoustic signals, of the breathing noises of the apparatus wearer is provided by a switch device located in the respiratory gas line which reacts to the respiratory gas stream for the suppression of the breathing noises.

8 Claims, 1 Drawing Sheet

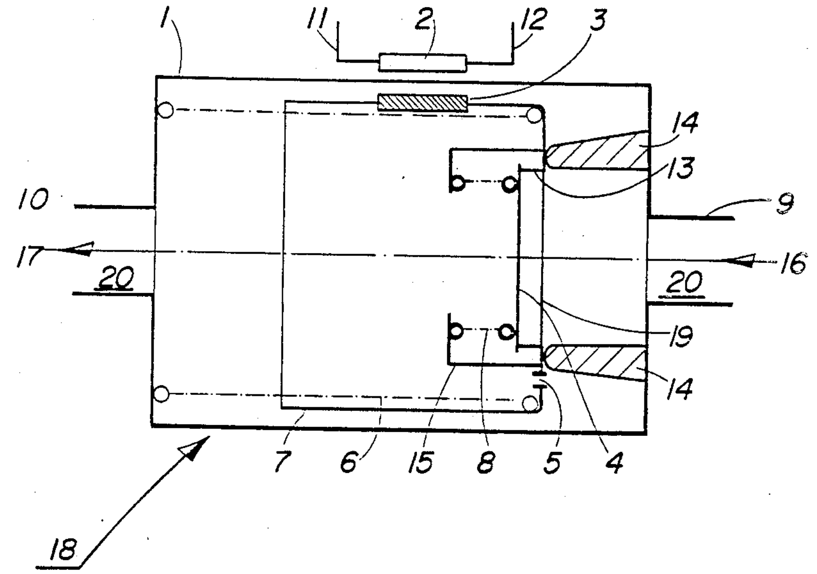
1
11
2
12
3
14
13
10
9
17
16
20
20
19
14
7
6
15
8
5
4
18

SPEAKING AND HEARING SYSTEM FOR BREATHING APPARATUS

FIELD AND BACKGROUND OF THE INVENTION

The invention relates in general to respirators and in particular to a new and useful speaking and hearing system for breathing apparatus where the apparatus wearer is connected to a respiratory gas supply independent of the environment.

Such speaking and hearing systems are used in particular for divers, pilots, or persons who need respirators in a rescue operation. In such operations it is often necessary that for example several divers can communicate with one another under water and that they are jointly connected to a monitoring station, from which the monitoring or supervising person can speak both with each single diver as well as with all of them jointly in a conference circuit. It is found to be a disadvantage that the breathing noise of one diver considerably disturbs the voice communication with another diver or the common speech connection to the monitoring station, so that it becomes difficult to understand. (German journal Drägerheft No. 244, September/October 1961, page 5403).

If all diver microphones are on and the monitoring person at the central station hears the breathing noises of all divers simultaneously, communication among the divers and with the monitoring person is rendered difficult or is not possible at all. Especially if the diver microphones are in the breathing mask or in the diver's helmet, the breathing noises are reproduced excessively loud, and if the respective person must perform physical work, the breathing becomes heavier and faster, so that a conversation between two participants is disturbed by the two simultaneously audible breathing noises.

Normally also electric filters are inserted in the voice circuit, which are intended to filter the narrow-band voice signal out of the wide-band hum-like breathing noise signal, because within the filter bandwidth the energy component of the voice signal is much higher. It is disadvantageous for such filter circuits that by acoustic resonances, in the mask or helmet region of the apparatus wearer, also the breathing noise is concentrated in its bandwidth. Owing to this, the hum energy within the filter bandwidth is so great that satisfactory breathing noise suppression does not occur.

Furthermore, the filters are designed for specific respiratory gas mixtures and diving depth pressures, so that their range of use is limited to the existing conditions.

SUMMARY OF THE INVENTION

The present invention provides a speaking and hearing system such that a suppression i.e. attenuation or elimination, of the breathing noises of the apparatus wearer, independent of acoustic signals, is realized.

In accordance with the invention a switching device reacting to the respiratory gas stream is provided in the respiratory gas line, to suppress the breathing noises.

With such an arrangement of the switching device it is achieved that the hearing and speaking system always suppresses the breathing noises, whereas while an apparatus wearer is speaking, the speaking and hearing system remains fully connected, because during speaking, the respiratory gas stream collapses and does not actuate the switching device. Hence the speaking and hearing system is usable independently of the composition of the respiratory gas, and the interfering breathing noises are suppressed directly, without the need to actuate any switches manually.

The switching device may be provided in the inhalation line or in the exhalation line as well as in both respiratory gas lines or in a line section common to inhalation and exhalation. In many cases, however, it is sufficient and is found desirable if the switching device is installed in the inhalation branch of the respiratory gas supply. Hence only the inhalation noises and suppressed, which are louder than the exhalation noises and therefore superimposed themselves on the voice frequencies more disturbingly than do the softer exhalation noises. The persons conversing with one another can advantageously monitor each other, in that they hear the exhalation noises and thereby obtain information about the normal vital rhythm of the apparatus wearer.

In a further development of the invention it is provided that the switching device includes a piston sliding in a sleeve and kept under tension. It is exposed to the flow of the respiratory gas, and there is, at its circumference, an actuating element for switching the speaking and hearing system. The piston inside the sleeve is moved by the pressure of the inhalation or exhalation stream in the direction of the flow path counter to the tensioning force exerted, for example by a spring. During this movement, the actuating element switches the contacts of the switching device of the respective apparatus wearer, so that transmission of the breathing noise to the listening-in connected apparatus wearer is interrupted or damped. The passage opening permits free flow of the respiratory gas during a breathing cycle across the switching device. The actuating element may be applied at any suitable point of the switching device. A suitable site is at the circumference of the piston, and it may be for example, a permanent magnet actuating a corresponding reed contact in the outer region of the sleeve.

Advantageously the passage opening is closed by a valve element clearing the flow path. A simple form of realization of this valve element comprises a spring-loaded disk valve. This additional valve is matched as to its opening behavior to the movement of the piston in such a way that it opens only after the actuating element has switched the speaking and hearing system.

It is appropriate to provide an opening bypassing the switching device, in order that, when the switching device is installed in the exhalation line, the speaking gas stream, which is much smaller than the exhalation gas stream, can freely flow through the exhalation line.

Accordingly it is an object of the invention to provide a speaking and hearing system for a breathing apparatus where the apparatus wearer is connected to a respiratory gas supply independent of the environment and which includes a switching device in the respiratory gas line which reacts to the respiratory gas stream for the suppression of the breathing noises.

A further object of the invention is to provide a device for regulating a speaking and hearing system for a breathing apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only figure of the drawings is a schematic sectional view of a respiratory gas system having a device for regulating the speaking and hearing constructed in accordance with the invention.

DESCRIPTION OF THE PREFERRED EMBODIMENT

Referring to the drawing in particular the invention embodied therein comprises a device for regulating speaking and hearing for a breathing apparatus which is connected in a respiratory gas line 20. In accordance with the invention the device includes a switch generally designated 18 arranged in a line 20 and which permits a gas flow therethrough which actuates a member for piston 7 disposed in the gas flow which is movable in response to the flow. An electrical breathing noise suppressant circuit includes connecting elements 11 and 12 having a reed contact switch 2 therein which is actuated by movement of the piston 7 and is effected through a permanent magnet 3.

The one and only figure shows a switching device 18 which can be inserted in the exhalation branch of a respiratory gas supply for example for divers. To this end the switching device is inserted with its inlet 9 and outlet 10 into an exhalation branch, line 20 so that the flow direction of the respiratory gas stream is fixed by the arrows 16 and 17. In a sleeve 1, of the device 18, for example a cylindrical sleeve, a piston 7 is slidingly received.

Piston 7 is pressed against two support lugs 14 by means of a spring 6, counter to the flow direction 16. In the end face of piston 7 exposed to the flow direction 16 is a passage opening 13, which is closed by a valve plate 4. A valve spring 8, which braces itself against a valve housing 15, stresses the valve plate 4. At the outer face of piston 7, which is open toward the outlet 10, is a permanent magnet 3, which serves to switch a reed contact 2 arranged opposite it on the outer face of sleeve 1. From the reed contact 2 two connections 11 and 12 lead to a speaking and hearing system (not shown). There, upon corresponding actuation of the reed contact 2, for example the microphone (not shown) of the speaking hearing system is switched.

In the illustrated form, the switching device is in an inactive position, in which, for example, the permanent magnet 3 holds the reed contact 2 closed, so that the voice microphone is switched for the transmission of the voice signals. When the apparatus wearer speaks, the voice signal is transmitted, and the small amount of exhalation air, necessary for speaking and of low flow velocity, the switching device is not actuated. The exhalation air necessary for speaking can escape via a bypass opening 5 through the switching system to the outlet 10. Only when the apparatus wearer has ceased to speak and after he has perhaps taken a breath, the exhalation air of high flow velocity, exhaled via the inlet 9, will press against the end face 19 of piston 7 exposed to the respiratory gas stream. The spring 6 and valve spring 8 are matched so the force of the valve spring 8 holds the valve plate 4 closed during the piston stroke, so that piston 7 is moved in the direction of the arrows 16 and 17 counter to the force of the spring 6. At that, the magnet 3 moves away from the reed contact 2 and opens it, so that the electric signal circuit of the apparatus microphone of the speaking and hearing system is damped or interrupted. Hence, from that time on no further voice signals or breathing noises are transmitted. At the end of the piston stroke, the pressure of the exhalation flow overcomes the force of the valve spring 8, so that the valve plate is lifted off the passage opening 13 and clears a passage for the exhalation gas to the outlet 10.

During the entire exhalation cycle the piston 7 thus remains in its switched position, during which the voice microphone remains damped or disconnected. Compared with the opening cross-sections, the bypassing 5 is so small that the respiratory gas stream continuously passing through it during exhalation is negligible and has no effect on the force conditions at the switching device.

While a specific embodiment of the invention has been shown and described in detail to illustrate the application of the principles of the invention, it will be understoood that the invention may be embodied otherwise without departing from such principles.

What is claimed is:

1. A device for regulating a voice communication system for a breathing apparatus which has at least one respiratory gas line through which breathing gases are passed for inhalation or exhalation or both, comprising a switching device located in the respiratory gas line and permitting a flow of gas therethrough, a member in said switching device in the gas flow movable in response to the gas flow, and an electrical breathing noise suppressant circuit connected to the voice communication system and associated with said member and actuated by movement of said member for suppressing breathing noises.

2. A device according to claim 1, including an inhalation line through which the person breathes, said member being positionable in said inhalation line.

3. A device for regulating a voice communication system for a breathing apparatus which has at least one respiratory gas line through which breathing gases are passed for inhalation or exhalation or both, comprising a switching device located in the respiratory gas line and permitting a flow of gas therehrough, a member in said switching device in the gas flow movable in response to the gas flow, and an electrical breathing noise suppressant circuit connected to the voice communication system and associated with said member and actuated by movement of said member for suppressing breathing noises, said switching device comprising a sleeve housing, a piston movable in said sleeve housing, a tensioning spring acting on said member biasing it in a direction counter to the respiratory gas flow, a valve member closing said sleeve housing against the flow of respiratory gas and being openable to admit respiratory gas flow therethrough, said suppressant circuit including an actuating element therein being actuated by movement of said member for switching the speaking and hearing system.

4. A device according to claim 1, wherein said sleeve housing has a passage opening closed by said valve, said actuating element comprising a magnet, said switch comprising a reed switch actuatable by said magnet.

5. A speaking and hearing system according to claim 4 including a spring biasing said valve into a closed position.

6. A speaking and hearing system according to claim 4, where in a bypass opening is provided in said member permitting a bypass flow through said member and around said housing.

7. A method of suppressing noise in a voice communication system which is subject to the generation of noises caused by inhalation and exhalation by the person who is breathing through individual inhalation and exhalation lines as well as persons breathing through only a single inhalation and exhalation line comprising positioning a member which is responsive to the flow of respiratory gases in an associated respiratory gas line and which is movable in response of flow of gases therethrough, and using the movement of the member to control a noise suppressant circuit so as to cause the suppressant circuit to educe the noise in the voice communication system.

8. A method according to claim 7, wherein the member which actuates the noise suppressant circuit is located only in an inhalation line.

* * * * *